(12) United States Patent
Martin

(10) Patent No.: US 6,722,409 B1
(45) Date of Patent: Apr. 20, 2004

(54) SNAP IN VALVE STEM

(75) Inventor: Rabian Matthew Martin, Hurdle Mills, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/287,398

(22) Filed: Nov. 4, 2002

(51) Int. Cl.[7] .......................... B60C 23/10; B60C 29/00; B60C 23/02

(52) U.S. Cl. ........................ 152/427; 152/415; 152/429; 73/146.8

(58) Field of Search ................................ 152/415, 416, 152/427, 429; 73/1.72, 146.3, 146.8; 403/292, 347, 361

(56) References Cited

U.S. PATENT DOCUMENTS

| | | | |
|---|---|---|---|
| 2,415,063 A | 1/1947 | Hosking | 152/430 |
| 2,818,101 A | 12/1957 | Boyer | 152/427 |
| 2,968,333 A | 1/1961 | Ayres | 152/427 |
| 2,995,168 A | 8/1961 | McCord | 152/427 |
| 3,362,731 A * | 1/1968 | Gasch et al. | 403/361 |
| 3,422,836 A * | 1/1969 | Hawkes | 152/427 |
| 3,830,277 A * | 8/1974 | Lejeune | 152/427 |
| 4,064,923 A * | 12/1977 | German et al. | 152/427 |
| 4,097,075 A | 6/1978 | Clayton | 285/332.3 |
| 4,254,312 A | 3/1981 | Migrin et al. | 200/61.25 |
| 4,310,014 A | 1/1982 | Parker | 137/227 |
| 4,475,578 A * | 10/1984 | Nidle | 152/415 |
| 5,027,848 A * | 7/1991 | Leeuwen | 137/227 |
| 5,103,670 A | 4/1992 | Wu et al. | 73/146.8 |
| 5,409,165 A * | 4/1995 | Carroll et al. | 403/292 |
| 5,774,048 A * | 6/1998 | Achterholt | 73/146.8 |
| 6,005,480 A * | 12/1999 | Banzhof et al. | 340/447 |
| 6,193,430 B1 * | 2/2001 | Culpepper et al. | 403/361 |
| 6,247,513 B1 * | 6/2001 | Lukins | 152/427 |
| 6,651,689 B1 * | 11/2003 | Stech | 152/415 |
| 2002/0025805 A1 | 2/2002 | Reimus | 455/420 |
| 2002/0050164 A1 | 5/2002 | Wallach | 73/146.3 |

* cited by examiner

Primary Examiner—S. Joseph Morano
Assistant Examiner—Jason R Bellinger
(74) Attorney, Agent, or Firm—Daniel S. Kalka

(57) ABSTRACT

A snap in valve stem 10 with a two piece insert 24, 26 design is capable of supporting a radio frequency transmitter 12 within a rim hole 28. Elastomeric body 16 includes a cylindrical portion 32 with an annular bead 36 and an enlarged base portion 34 with an annular flange 38 to provide an airtight seal of the valve stem 10 within the rim hole 28. The two piece insert 24, 26 design in conjunction with an annular recess 40 and a lowermost extending portion 42 within the elastomeric body 16 allows the inserts 24, 26 to flex independently of each other which makes for a rapid, simple, easy installation process.

16 Claims, 3 Drawing Sheets

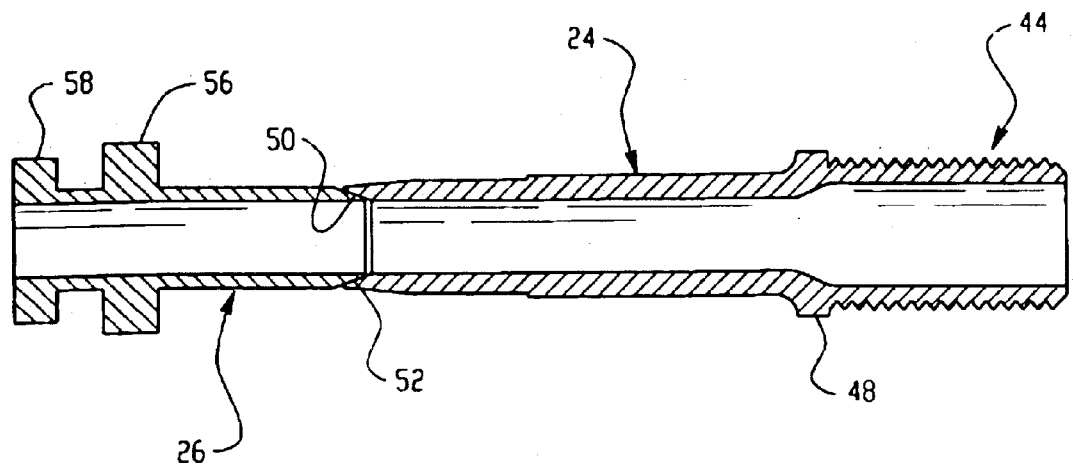
Fig. 4
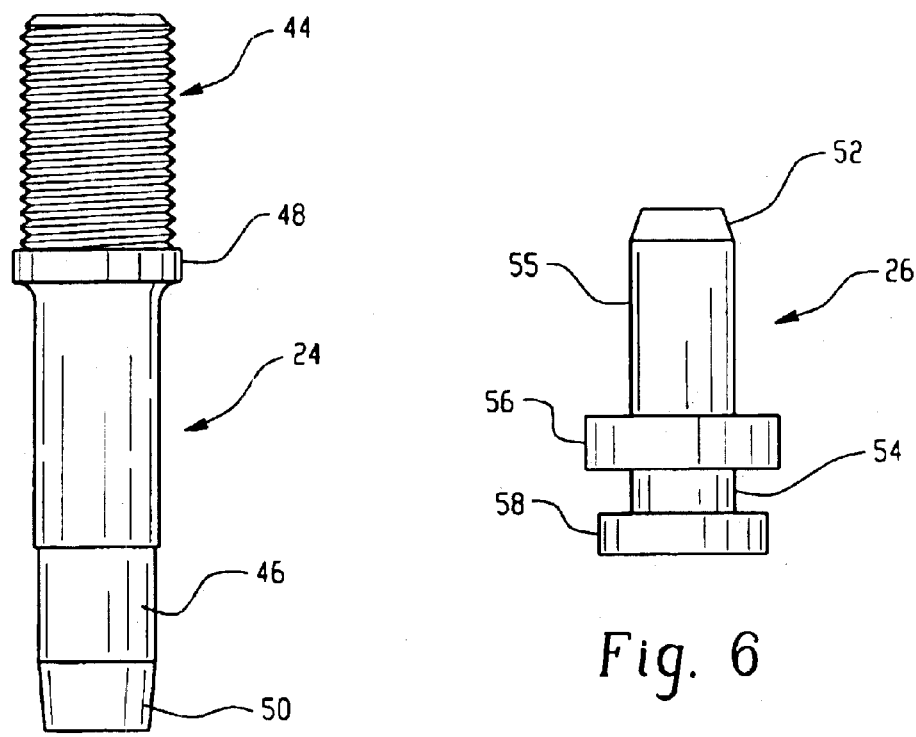
Fig. 5
Fig. 6

SNAP IN VALVE STEM

BACKGROUND OF THE INVENTION

1. Field of the Invention

The present invention relates in general to a snap in valve stem constructed to support a structure, and more particularly to a snap in valve stem for use with a tubeless tire capable of supporting a radio transmitter package for a tire pressure monitoring system.

2. Description of the Related Art

While the present invention finds particular utility as a tubeless tire valve stem and will be described with specific reference thereto, it should be understood that the present invention has broader applications and can find utility in any application employing a snap in valve stem or where the valve stem supports some type of a structure or device.

Snap in valve stems for tubeless tires are well known in this art. These valve stems are designed with a rubber body or housing that is inserted through a valve stem opening from inside a tire rim, also referred to as the underside of a tire rim. The rubber body is pulled and stretched at least in part through the valve stem opening and "snapped" in place. The rubber is confined within the space of the opening and is compressed peripherally around the valve stem opening to provide an airtight fit. Snap in valve stems have become quite standardized in the tire industry. They need to be capable of being securely mounted upon the rim, being airtight, and remaining airtight when the tire is inflated and in service. Examples of such snap in valve stems are disclosed in U.S. Pat. Nos. 2,818,101, 2,968,333, and 2,995,168.

Recently, there has been a significant amount of interest in proper tire inflation. An under inflated or over inflated tire will cause uneven tread wear and will shorten the useful life of the tire. Underinflated tires are known to cause tread separation and/or blowouts which can lead to serious injury and property damage. Tire pressure monitoring systems are devices that are found in some commercial vehicles or luxury automobiles. These devices alert the vehicle operator when a tire's pressure falls below or exceeds a desired or predetermined optimum pressure. Some of the components of a tire pressure monitoring system are typically mounted inside the tire rim, like for example, the radio transmitter assembly. A transmitter assembly located in each tire communicates via radio frequency or other means with a command module in the vehicle cab. The command module can use visual or audio signals to alert the operator if one or more of the tires are underinflated or overinflated, and in some cases depending upon the complexity of the system may even take corrective actions or advise a centralized fleet vehicle command center for on the road maintenance. As the costs for tire pressure monitoring systems continue to decline and their popularity increases, there will be a greater demand for these systems for use on all types of vehicles.

The valve stems employed with these tire pressure monitoring systems are a metal clamp-in type or bolt on valve stem, or an equivalent structure, that can support the radio transmitter assembly. These types of valve stems are costly and fairly complex structures. Additionally, they can be time consuming to install.

It has now become desirable to develop a valve stem with a snap in design that is capable of supporting a transmitter assembly of a tire pressure monitoring system within the rim of a tire. The snap in valve stem should have a design that allows for a simple, easy, straightforward process for installation, and yet provide a sturdy, rugged support for the tire pressure monitoring system transmitter.

BRIEF SUMMARY OF THE INVENTION

An object of the present invention is to provide a snap in valve stem adapted for mounting in an opening and supporting a structure therein.

Another object of the present invention is to provide a snap in valve stem for a tubeless tire capable of supporting a radio transmitter assembly of a tire pressure monitoring system.

Another object of the present invention is to provide a snap in valve stem having a two piece insert design that allows one side of the valve stem to flex independently of the other side of the valve stem to facilitate easy mounting within an opening and still support the tire pressure monitoring system transmitter.

The above and other objects of the present invention are accomplished with a snap in valve stem adapted for mounting in an opening and for supporting a structure, comprising a body formed of an elastomeric material and having a longitudinally extending bore therethrough. The body has an upper end portion and a lower end portion. The external diameter of the body increases in diameter towards the lower end portion. The upper end portion has an external diameter constructed to pass through an opening and the lower end portion has a diameter constructed to sealingly interfit within the opening. A first insert is received within the bore of the body at the upper end of the body, and has an outer end extending out from the upper end portion of the body. The outer end of the first insert is constructed to receive a cover. An interior surface of the outer end of the first insert is constructed for receiving a valve core. The first insert includes an inner end that terminates within the lower end portion of the body. A second insert with an inner and outer end is also received within the bore of the body at the lower end portion of the body. The outer end of the second insert extends out from the lower end portion and includes means for supporting a structure.

The two piece insert design in accordance with the present invention allows the body of the valve stem to stretch during insertion in the opening and then compress after insertion for providing a sealing fit.

The various features of novelty which characterize the invention are pointed out with particularity in the claims annexed to and forming a part of this disclosure. For a better understanding of the invention, its operating advantages, and specific objects attained by its uses, reference is made to the accompanying drawings, and descriptive matter in which a preferred embodiment of the invention is described and illustrated.

BRIEF DESCRIPTION OF THE DRAWINGS

FIG. 4 is a sectional view of the inserts of the snap in valve stem in accordance with the present invention;

FIG. 5 is an elevated view of the first insert in accordance with the present invention; and FIG. 6 is an elevated view of the second insert in accordance with the present invention.

DETAILED DESCRIPTION OF THE INVENTION

Figure 1:
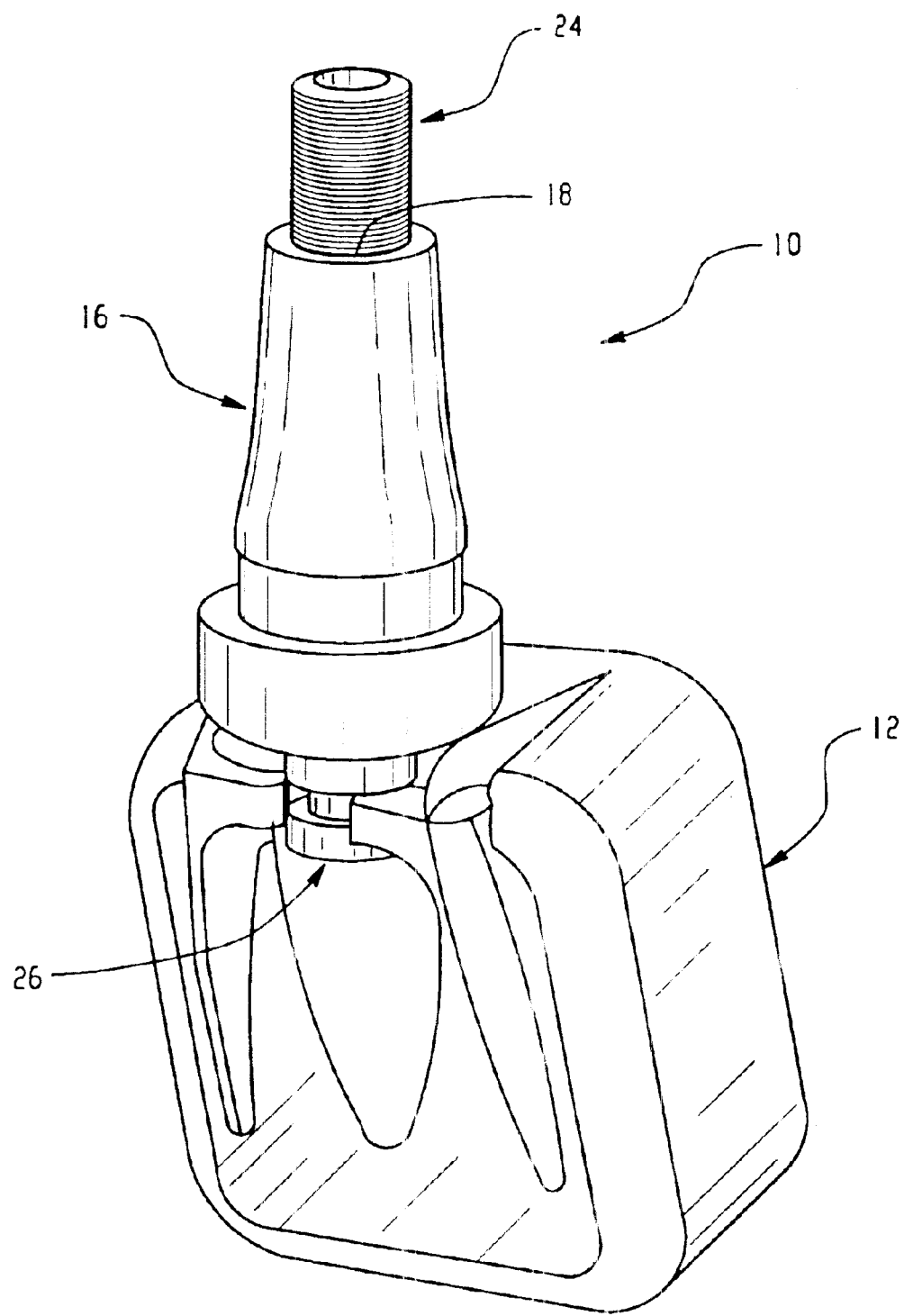
FIG. 1 is an elevated view of a snap in valve stem attached to a transmitter assembly in accordance with the present invention.

Referring to the figures, which are not intended to limit the present invention thereto, and where like numerals designate like or similar features throughout the several views, and first in particular to FIG. 1, there is shown a snap in valve generally designated 10 according to the present invention mounted to and supporting a transmitter assembly 12. Transmitter assembly 12 is a module that is commercially available containing a radio frequency transmitter for a tire pressure monitoring system. Module 12 and the electrical components contained therein are well known and require no detailed explanation here since the present invention is not directed to that subject matter.

Figure 2:
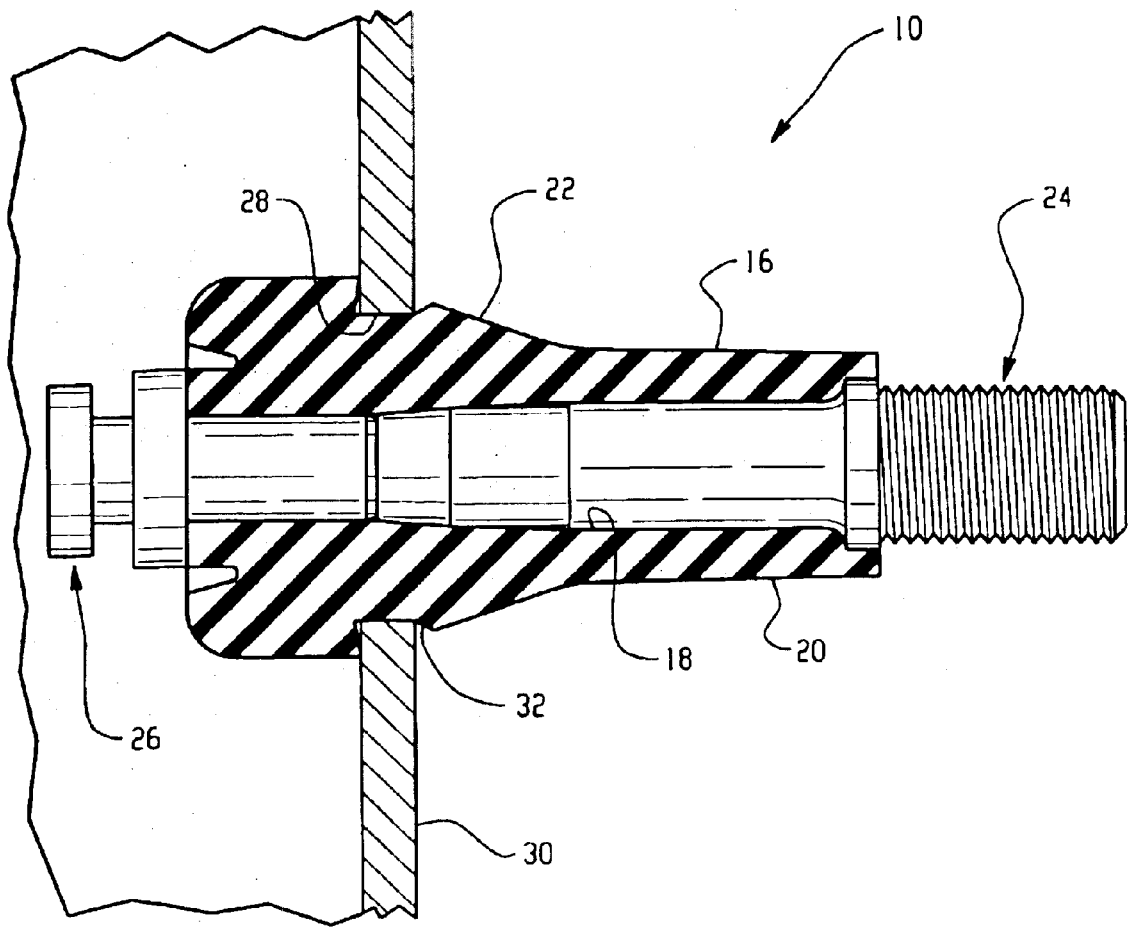
FIG. 2 is a sectional view of the valve stem according to the present invention shown mounted in an opening.

Next referring to FIG. 2, snap in valve 10 comprises a body 16 made of an elastomeric material like rubber or other resilient thermoplastic material. The term "rubber" as used herein is intended in its generic sense to denote natural rubber, synthetic rubber, blends thereof, or any suitable elastomeric material. Body 16 has a longitudinal bore 18 extending therethrough, and includes an upper end portion 20 with an external diameter that increases as it merges into a lower end portion 22. A first insert 24 is disposed in the bore 18 in the upper end portion 20 of body 16, and a second insert 26 is disposed within the bore 18 in the lower end portion 22.

Figure 3:
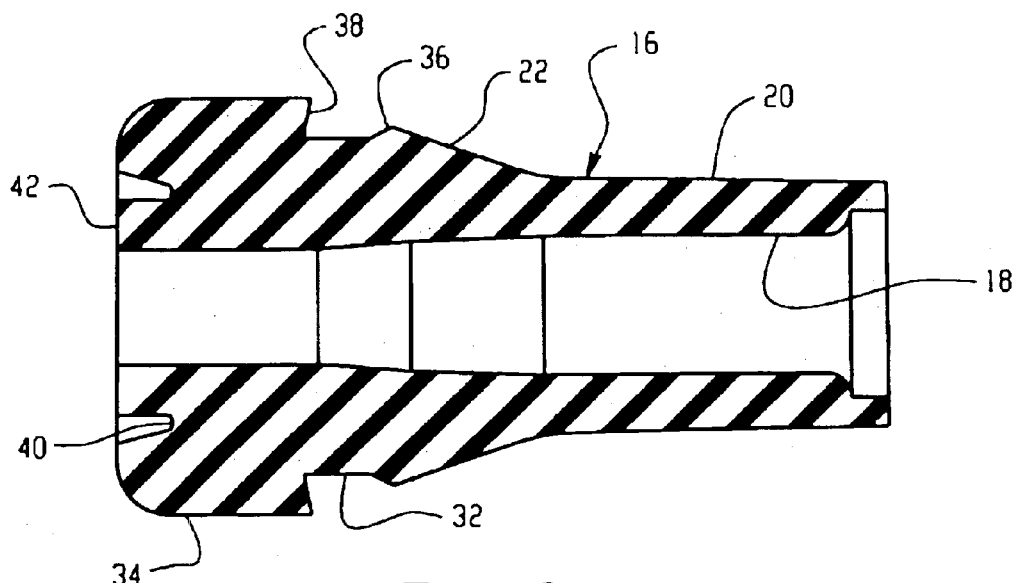
FIG. 3 is a sectional view of the body of the valve stem according to the present invention.

Referring now to both FIGS. 2 and 3, the upper end portion 20 of body 16 of valve stem 10 is sized to pass into and through an opening 28 of a tire rim 30. Upper end portion 20 may be substantially cylindrical or taper slightly in an outwardly direction to what is termed herein the outboard side of the rim 30. Upper end portion 20 of body 16 has an increasing external diameter merging into the lower end portion 22. Lower end portion 22 includes a cylindrical portion 32 and an enlarged base portion 34. Cylindrical portion 32 preferably includes an annular bead 36 on its edge closest to the upper end portion 20. Enlarged base portion 34 preferably includes an annular flange 38 on its edge closest to the upper end portion 20. Annular flange 38 of enlarged base portion 34 and annular bead 36 of the cylindrical portion 32 as well as the cylindrical portion 32 and enlarged base portion 34 function cooperatively to provide a sealing interfit of the valve stem 10 in the opening 28 in rim 30. When longitudinal force is exerted on the body 16 and inserts 24, 26 of the valve stem 10, the elastomeric material of the body 16 especially in the zone where the inserts 24, 26 meet is free to stretch or to attenuate wherein the external diameter of the cylindrical portion 32 of body 16 at this location is momentarily reduced. This action results in the stretching and elongation of the rubber body 16. When the cylindrical portion 32 is positioned in place in the opening 28, the cylindrical portion 32 with its annular bead 36 becomes compressed against the rim 30 as does also the annular flange 38 of the enlarged base portion 34 on the opposite side of the rim 30. The periphery of body 16 in this region tightly engages the circumferential wall of the opening 28 and provides a rugged, airtight seal. The enlarged base portion 34 preferably also includes an annular recess 40 surrounding a lowermost extending portion 42 on the enlarged base portion 34 for a purpose which will be described in detail later herein with respect to the flexibility of the valve stem 10.

The first and second inserts 24, 26 are preferably tubular and hollow, and made of metal, like brass or brass plated metal. Of course, the inserts 24, 26 may be made of an equivalent, rigid non-metallic material or other metal material as well. The first insert 24 is received in the bore 18 at the upper end 20 of body 16 and includes an outer end 44 which extends out from the body 16 on the outboard side and an inner end 46 which extends a predetermined distance in the body 16. The second insert 26 is received in the bore 18 at the lower end 22 of body 16, and includes an outer end 54 extending from the body 16 and an inner end 55 disposed within the body 16.

The outer end 44 of the first insert 24 may be threaded for receiving a valve cap or cover (not shown). Preferably, the inner end 46 of the first insert 24 terminates in the region of the cylindrical portion 32 of the body 16. The first insert 24 includes a stepped external diameter beginning at its outer end 44 with flange 48 and gradually decreases in diameter from the outer end 44 to a tapered end that also includes a beveled edge 50 on its interior surface. The beveled edge 50 receives a corresponding beveled edge 52 disposed on the exterior surface of the inner end 55 of the second insert 26. The outer end 44 of the first insert 24 further includes a threaded interior surface for receiving a valve core (not shown) as is known in this art for a valve stem.

The portion of second hollow insert 26 received within the bore 18 of body 16 has an external diameter approximately corresponding to the external diameter of the first insert 24. An outer end 54 of second insert 26 extends out from the lower end portion 22 of body 16 and includes a first cylindrical portion 56 disposed immediately adjacent the enlarged base 34 of body 16. The first cylindrical portion 56 has an external diameter that is larger in size than the external diameter of the portion of the second insert 26 within body 16. The outer end 54 of the second hollow insert 26 further includes a second cylindrical portion 58 spaced apart from said first cylindrical portion 56. The second cylindrical portion 58 of the second hollow insert 26 has an external diameter that is selectively sized and situated to mesh with and engage a mating collar or receptacle 60 on transmitter module 12. Of course, the second cylindrical portion 58 may be constructed with any means that secures the transmitter module 12 thereto and provides support therefor, including but not limited to, a threaded portion, an interference type fitting, a press fitting, a fastener, or equivalent. In addition, it should be understood that the valve stem according to the present invention may be utilized for supporting other structures, including but not limited to, a pressure sensor or transducer, flow regulating device, etc.

To assemble the snap in valve stem 10, the inserts 24, 26 may be pressed and secured within the bore 18 of the body 16. Alternatively, the body 16 is molded around the inserts 24, 26. Or, the body 16 may be bonded or vulcanized directly to the inserts 24, 26 in a manner such that the elastomeric material surrounding them provides a positive adhesion so that in effect the inserts 24, 26 become an integral part with the elastomeric material of the valve 10. Still, the body 16 throughout its length retains its elasticity and is longitudinally stretchable in part due to the two piece insert 24, 26 design which allows both separation of the inserts and the ability for the inserts to flex due to their beveled edges 50, 52 in accordance with the present invention.

During the molding process, the first cylindrical portion 56 of the second insert 26 preferably has the elastomeric material covering the outer surface. This helps to retain the second insert 26 firmly within the body 16. As mentioned previously, the second cylindrical portion 58 is employed to engage and lock into the collar 60 of module 12. Annular recess 40 in the enlarged base portion 34 facilitates the flexibility of the valve stem by providing space, elasticity, and a pivoting point for movement of the outer end 54 of the second insert 26 so it flexes easily within the valve stem 10. The two piece hollow insert design in accordance with the present invention allows the outboard side of valve stem 10 to flex independent of the inboard side, or vice versa, and yet support transmitter assembly 12. The rubber body 16 preferably molded around the first and second hollow inserts 24, 26 allows for rubber elongation during the rim hole 28, insertion. The first hollow insert 24 which includes a smaller stepped diameter allows for the body 16 to compress during rim insertion which lowers the force required to pull the cylindrical portion 32 through the rim hole 28 and secure it therein. The second hollow insert 26 during the molding process meshes with and seals against the first hollow insert 24 and prevents any rubber material from blocking the air passage way therethrough. The design of the instant invention allows the first and second hollow inserts 24, 26 to separate during rim insertion for allowing an area for rubber compression and reduced pull-in forces.

While specific embodiments of the invention have been shown and described in detail to illustrate the application of the principles of the invention, it will be understood that the invention may be embodied otherwise without departing from such principles.

I claim:

1. A snap in valve stem adapted for mounting in an opening and for supporting a structure, comprising:
   a body formed of an elastomeric material and having a bore extending longitudinally therethrough, said body having an upper end portion with a diameter that increases as it merges into a lower end portion, said upper end portion having a diameter constructed to pass through an opening and said lower end portion having a diameter constructed to sealingly interfit within the opening;
   a first insert constructed to be received within said bore of said body at said upper end portion of said body, said first insert having an outer end extending from said upper end portion of said body, said outer end of said first insert having an interior surface constructed to receive a valve core, said first insert having an inner end terminating within said lower end portion of said body, said inner end of said first insert having a beveled edge on an interior surface thereof; and
   a second insert constructed to be received within said bore of said body at said lower end portion thereof, said second insert having an inner end and an outer end, said inner end of said second insert having a beveled exterior surface constructed to be received within said beveled edge on the interior surface of said first insert for providing a flexible joint said outer end of said second insert extending from said lower end portion of said body and providing means for supporting a structure.

2. A snap in valve stem as recited in claim 1, wherein said first insert comprises a stepped external diameter.

3. A snap in valve stem as recited in claim 1, wherein said outer end of said first insert comprises a threaded portion.

4. A snap in valve stem as recited in claim 1, wherein said inner end of said first insert tapers inwardly.

5. A snap in valve stem as recited in claim 1, wherein said means for supporting a structure comprises said outer end of said second insert having a first cylindrical portion and a second cylindrical portion positioned axially outward from the lower end portion of said body, said first and second cylindrical portions having an external diameter larger than an external diameter of said second insert within said body, said second cylindrical portion being disposed in a spaced manner from said first cylindrical portion.

6. A snap in valve stem as recited in claim 4, wherein said inner end of said second insert comprises a beveled edge on an exterior surface thereof, said beveled edge of said inner end of said second insert being constructed to be received within said beveled edge of said inner end of said first insert.

7. A snap in valve stem as recited in claim 6, wherein said beveled edge of said second insert tapers inwardly.

8. A snap in valve stem as recited in claim 6, wherein said means for supporting a structure comprises said outer end of said second insert including a first cylindrical portion having an external diameter larger in size than a remaining portion of said second insert within said body, and a second cylindrical portion spaced away and apart from said first cylindrical portion, said second cylindrical portion having an external diameter larger in size than said remaining portion of said second insert within said body.

9. A snap in valve stem as recited in claim 1, wherein said lower end portion of said body comprises an enlarged base portion, said enlarged base portion including an annular flange disposed on an upper edge of said enlarged base portion.

10. A snap in valve stem as recited in claim 9, wherein said lower end portion of said body further comprises a cylindrical portion disposed adjacent said annular flange.

11. A snap in valve stem as recited in claim 10, wherein said lower end portion of said body further comprises an annular bead merging into said cylindrical portion, said annular bead being positioned on an upper edge of said cylindrical portion.

12. A snap in valve stem as recited in claim 11, wherein said lower end portion further comprises an annular recess disposed in a lower end of said enlarged base portion.

13. A snap in valve stem as recited in claim 11, wherein said inner end of said first insert extends within said bore of said body to said cylindrical portion of said body, and said inner end of said second insert extends within said bore of said body to said cylindrical portion of said body.

14. A snap in valve stem as recited in claim 12, wherein said lower end of said enlarged base portion further includes a lowermost extending portion, and said annular recess surrounds said lowermost extending portion.

15. A snap in valve stem as recited in claim 14, wherein said lowermost extending portion has an external diameter substantially corresponding to said second insert.

16. A snap in valve stem as recited in claim 15, wherein said inner end of said first insert extends within said bore of said body to said cylindrical portion of said body, and said inner end of said second insert extends within said bore of said body to said cylindrical portion of said body.

* * * * *